United States Patent
Lin et al.

(10) Patent No.: US 8,250,929 B2
(45) Date of Patent: Aug. 28, 2012

(54) LOAD DEVICE FOR SOFC STACK AND A HIGH-TEMPERATURE FURNACE USING THE SAME

(75) Inventors: Hung-Hsiang Lin, Taoyuan County (TW); Ruey-Yi Lee, Taoyuan County (TW); Yung-Neng Cheng, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 714 days.

(21) Appl. No.: 12/465,936

(22) Filed: May 14, 2009

(65) Prior Publication Data
US 2010/0098984 A1  Apr. 22, 2010

(30) Foreign Application Priority Data
Oct. 22, 2008  (TW) ............................... 97140409 A

(51) Int. Cl.
G01N 3/08 (2006.01)
(52) U.S. Cl. ............................... 73/818; 73/788
(58) Field of Classification Search ............ 73/790, 73/788, 796, 797, 798, 818, 803; 29/407.08
See application file for complete search history.

(56) References Cited

U.S. PATENT DOCUMENTS

| | | | | |
|---|---|---|---|---|
| 2,699,060 A * | 1/1955 | Safford | ............................ | 374/51 |
| 3,492,566 A * | 1/1970 | Gross | ............................. | 324/201 |
| 3,975,950 A * | 8/1976 | Erdei | .............................. | 73/790 |
| 4,475,403 A * | 10/1984 | Lentz | ............................... | 73/798 |
| 4,762,003 A * | 8/1988 | Cioletti | ........................... | 73/825 |
| 4,793,047 A * | 12/1988 | Curtis et al. | ................ | 29/407.08 |
| 5,251,498 A * | 10/1993 | Nakatsukasa et al. | ....... | 73/865.8 |
| 5,435,187 A * | 7/1995 | Ewy et al. | ........................ | 73/856 |
| 5,448,168 A * | 9/1995 | Hirano et al. | .................. | 324/209 |
| 5,456,118 A * | 10/1995 | Hines et al. | ..................... | 73/818 |
| 5,461,928 A * | 10/1995 | Azzolini et al. | ................ | 73/818 |
| 5,659,140 A * | 8/1997 | Jakob et al. | ..................... | 73/788 |
| 5,712,431 A * | 1/1998 | Vilendrer | ........................ | 73/841 |
| 5,986,221 A * | 11/1999 | Stanley | .......................... | 177/136 |
| 6,536,098 B1 * | 3/2003 | Luo et al. | ................... | 29/603.03 |
| 7,661,184 B2 * | 2/2010 | Putnam et al. | ............. | 29/407.08 |
| 2003/0061883 A1* | 4/2003 | Ichiki et al. | ..................... | 73/788 |
| 2004/0192526 A1* | 9/2004 | Nakayama et al. | ............. | 492/40 |
| 2006/0283261 A1* | 12/2006 | Hsiao | .............................. | 73/788 |
| 2007/0196704 A1* | 8/2007 | Valensa et al. | .................. | 429/20 |
| 2008/0038622 A1* | 2/2008 | Valensa et al. | .................. | 429/38 |
| 2008/0280178 A1* | 11/2008 | Spink et al. | ..................... | 429/26 |
| 2010/0096607 A1* | 4/2010 | Lin et al. | ....................... | 254/2 B |

* cited by examiner

*Primary Examiner* — Lisa Caputo
*Assistant Examiner* — Punam Roy
(74) *Attorney, Agent, or Firm* — WPAT, PC; Justin King

(57) ABSTRACT

A load device for planar solid oxide fuel cell stack comprises: a balance plate, a high-temperature compressed column, a load cell, an elastic member, an equalizing ring, and an actuator. The balance plate is disposed abutted against the fuel cell stack, and the high-temperature compressed column is disposed on the balance plate, and the load cell and the elastic member are arranged at a top portion of the high-temperature compressed column. The actuator, being placed on the equalizing ring, is used for providing a load to the equalizing ring, the load cell, the elastic member and the high-temperature compressed column Thereby, the load exerted by the actuator can be detected from the measurement of the load cell while the relationship between the load variation and performance of the SOFC stack can be read directly or transmitted to an external device for display.

27 Claims, 3 Drawing Sheets

LOAD DEVICE FOR SOFC STACK AND A HIGH-TEMPERATURE FURNACE USING THE SAME

FIELD OF THE INVENTION

The present invention relates to a load device for planar solid oxide fuel cell (SOFC) stack, and more particularly, to a load device capable of exerting a pressure uniformly on a cell stack for measuring and recording the relationship between the performance of the cell stack and variation of the loading pressure with respect to time so as to be used in an analysis for understanding the affection of the loading pressure can have upon the performance of the cell stack and the characteristic of the glass cement used in the stack while using the analysis as basis for improving the design of the cell stack.

BACKGROUND OF THE INVENTION

The scope of solid oxide fuel cell (SOFC) applications to industry had been widen rapidly in recent years. This is because it can provide many advantages over traditional energy conversion systems including: tolerant to high temperature, high energy conversion efficiency, environmental friendly, and so on. As the SOFC is usually operating at extremely high temperatures, the contact resistance between the parts composing the SOFC can be a significant factor affecting its performance. Thus, for designing an efficient SOFC stack, it is required to perform a test for understanding the affection of load variation on a SOFC stack can have upon the contact resistances in the SOFC stack as well as its performance.

Conventionally, after the assembling of a SOFC stack is completed, it is being subjected to a load, like a carbon steel block or a stainless steel block, for stabilizing the same from tipping over and preparing the same to be move into a high-temperature furnace where it is heated to its designated operating temperature for sintering the glass cement in the cell stack; and then, after performing a performance test upon the heated SOFC stack, it is cooled down and then moved out of the furnace for changing the amount of load exerting upon the SOFC stack so as to be prepared for another performance test. Thus, by the data obtained from the aforesaid process, the affection of load variation upon the performance of the SOFC stack can be analyzed. However, it is noted that by the aforesaid process, not only the relationship between a load and a SOFC stack can not be inferred, but also there is no way of knowing how a glass cement used in the SOFC stack is to react to the load variation and there is no way to adjust the amount of load that is exerting on the SOFC stack in a real-time manner for responding to the resulting SOFC performance or the glass cement reaction. Not to mention that it is not only difficult and time consuming for obtaining any numerical measurement from the aforesaid process, but also it is difficult to adjust the load for the SOFC stack. Thus, such conventional process might not have any practical usage in real SOFC applications.

Therefore, it is in need of a load device for SOFC stack and a high-temperature furnace using the same that are capable of solving the aforesaid shortcomings.

SUMMARY OF THE INVENTION

In view of the disadvantages of prior art, the primary object of the present invention is to provide a load device for planar SOFC stack, capable of adjusting the load of a SOFC stack in a real time manner so as to enable a performance test to be performed upon the SOFC stack while the SOFC is operating in a high-temperature furnace.

Another object of the invention is to provide a high-temperature furnace for SOFC stack, adapted for performing a performance test upon a SOFC stack as the SOFC stack is loaded in a load device and operating in the high-temperature furnace, and thereby, enhancing the flexibility to the usage of the high-temperature furnace.

To achieve the above objects, the present invention provides a load device for planar solid oxide fuel cell (SOFC) stack is disclosed, which comprises: a balance plate, a high-temperature compressed column, a load cell, an elastic member, an equalizing ring, and an actuator. The balance plate is abutted exactly against the top of the fuel cell stack, and the high-temperature compressed column is disposed on top of the balance plate, while disposing the load cell and the elastic member at a top portion of the high-temperature compressed column. As the actuator is placed on top of the equalizing ring, the actuator is used for providing a load to the equalizing ring, the load cell, the elastic member and the high-temperature compressed column in a manner that the high-temperature compressed column is driven to press on the balance plate for enabling the same to exert a pressure on the fuel cell stack. When the aforesaid load device for SOFC stack is applied in a high temperature furnace, the load exerted by the actuator can be detected from the measurement of the load cell while the relationship between the load variation and performance of the SOFC stack can be read directly or transmitted to an external device for display.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
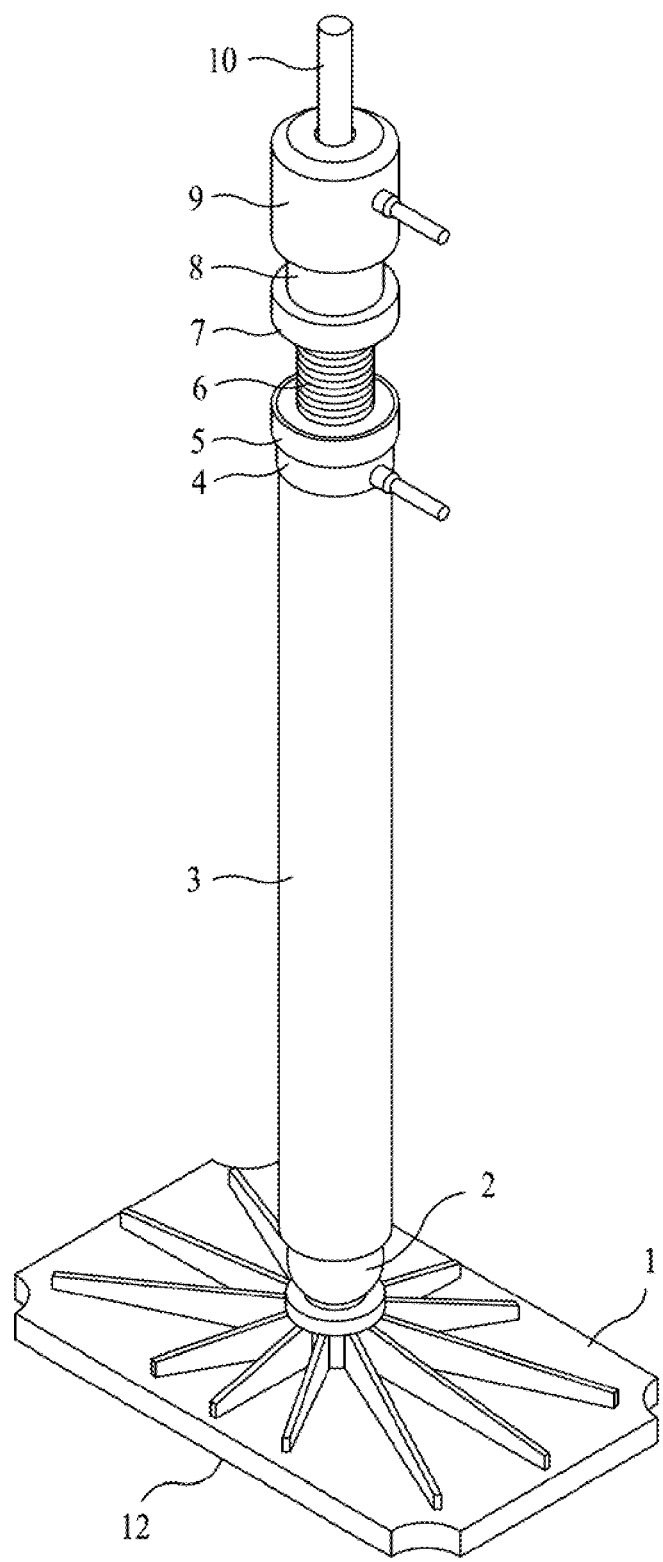
FIG. 1 is a sectional view of a three-dimensional diagram of a load device for SOFC according to an embodiment of the invention.
Figure 2:
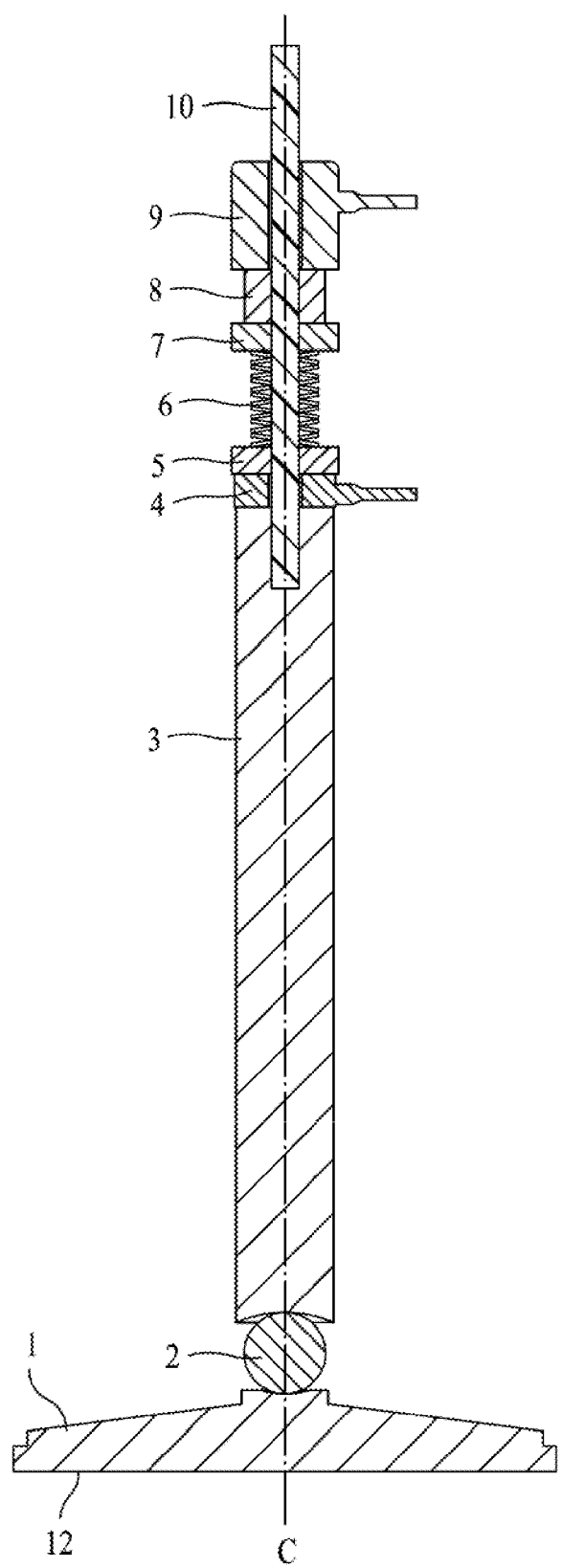
FIG. 2 is a cross sectional view of a load device for SOFC according to an embodiment of the invention.

As shown in FIG. 1 and FIG. 2, a load device for cell stack is comprised of: a balance plate 1, an equalizing ball 2, a high-temperature compressed column 3, a load cell 4, a lower press ring 5, an elastic member 6, an upper press ring 7, an equalizing ring 8, an actuator 9 and a constant-temperature compressed column 10.

Figure 3:
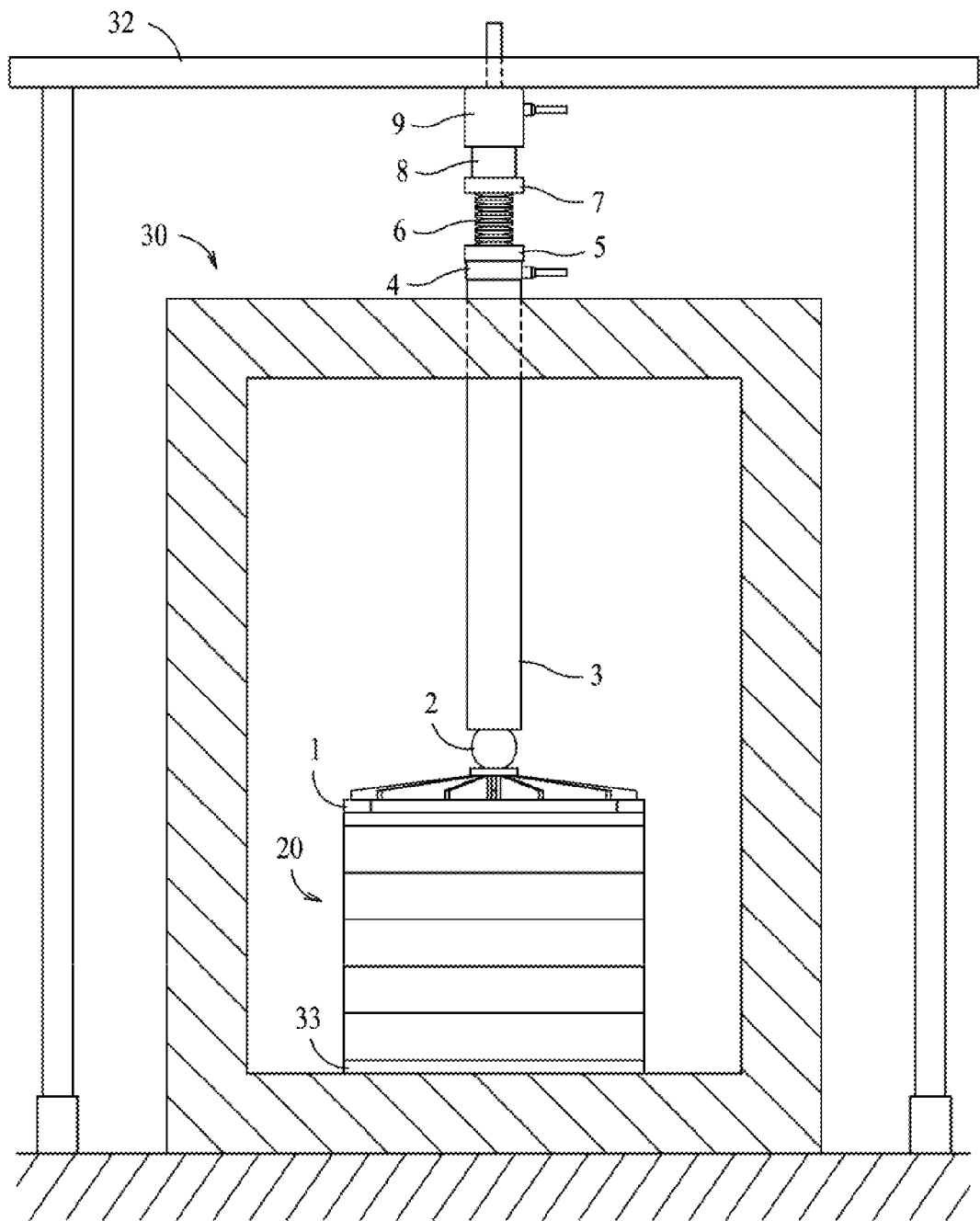
FIG. 3 shows a high-temperature furnace having a load device for SOFC received therein according to an embodiment of the invention.

The balance plate 1 is configured to abut against the top of the cell stack 20, as shown in FIG. 3, which can be of any type as well as any shape. However, as most cell stack is formed as a rectangle as the one shown in this embodiment, the balance plate 1 is mostly formed as a flat rectangle plate that is large enough just to cover the top of the cell stack 20. The high-temperature compressed column 3 disposed on top of the balance plate 1 in a manner that its axis C is disposed right on the center of the balance plate 1 and perpendicular to the bottom 12 of the same, as shown in FIG. 2. Moreover, the equalizing ball 2 is received inside a space enclosed between a concave 31 formed on the bottom of the high-temperature compressed column 3 and another concave 32 formed on the top of the balance plate 1. for ensuring the equalizing ball 2 to abut against the two concaves 31, 32 exactly, the arcs of the two concaves 31, 32 are designed to be larger than the arc of the equalizing ball 2. By arranging the equalizing ball 2 between the balance plate 1 and the high-temperature compressed column 3, the uprightness degree of the high-temperature compressed column 3 can be fine tuned for preventing the high-temperature compressed column 3 from tilting and thus ensuring the same to transmit all the load received thereby to the balance plate 1. As the balance plate 1, the equalizing ball 2 and the high-temperature compressed column 3 are all disposed inside a high-temperature furnace, they should all be made of a material capable of resisting a high temperature that is at least 820° C., such as sintered ceramics, so that their structural integrity can be maintained without being deformed by high temperature.

In addition, there is a constant-temperature compressed column 10 mounted on top of the high-temperature compressed column 3 in a coaxial manner while enabling the same to pass through the centers of the load cell 4, the lower press ring 5, the elastic member 6, the upper press ring 7, the equalizing ring 8 and the actuator 9, by that the load cell 4, the lower press ring 5, the elastic member 6, the upper press ring 7, the equalizing ring 8 and the actuator 9 can all be fixed and positioned. As the constant-temperature compressed column 10 is disposed outside the high-temperature furnace, it can be made of a common steel whichever is strong enough to withstand the heat transmitted from the high-temperature compressed column 3, such as SS 304, SS 310, etc. Moreover, the constant-temperature compressed column 10 can be integrally formed with the high-temperature compressed column 3.

As shown in FIG. 1, the load cell 4, the lower press ring 5, the elastic member 6, the upper press ring 7, the equalizing ring 8 and the actuator 9 are sequentially stacked one on the other and placed on top of the high-temperature compressed column 3. The load exerted by the actuator 9 as well as the displacement resulting therefrom can be detected by the load cell 4 while the measurement of the load cell 4 can be read directly or transmitted to an external device for display. In addition, except for working cooperatively to hold and fix the elastic member 6, the lower press ring 5 and the upper press ring 7 can prevent the elastic member from touching the high-temperature compressed column 3 directly, by that not only the friction between the two can be prevented, but also it can prevent the elastic member 6 from deforming by the heat transmitted from the high-temperature compressed column 3. In this embodiment, the elastic member 6 is a disc spring that is used as a buffer. The equalizing ring 8, being stacked on top of the upper press ring 7, is used for supporting a portion of the load so as to enabling the load to press on the cell stack uniformly. The actuator 9 is used to exert a load slowly on the equalizing ring 8 for pressing the same to move vertically downward. It is noted that the load cell 4, the elastic member 6 and the actuator 9 can all be products currently available on the market that they can be acquired according to any actual load specification without restrictions. Moreover, the lower press ring 5, the upper press ring 7 and the equalizing ring 8 are all disposed outside the high-temperature furnace, so that they all can be made of common steel, such as SS 304, SS 301, and so on.

As shown in FIG. 3, the high-temperature furnace 30 is structural similar to any common high-temperature furnace that it can be fitted with a sliding door or a lifting door, but is different in that: it is designed for receiving the aforesaid load device disclosed in the present invention. In FIG. 3, by mounting the load device of the invention to the supporting plate 32 of the high-temperature furnace 30 in a manner that the supporting plate 32 is fixed on top of the actuator 9, the load cell can be positioned inside the high-temperature furnace 30. After a cell stack 20 is placed on a bottom plate 33 inside the high-temperature furnace 30 for enabling the balance plate 1 of the load device to abut against the top thereof, the high-temperature compressed column 3 is fine tuned for ensuring the same to be place exactly vertical to the top of the cell stack 20. Thereafter, the high-temperature furnace 30 can be closed for heating and then the actuator 9 of the load device is activated for exerting load to the cell stack. During the load exerting process, the displacement resulting the load exerting of the actuator 9 can be detected by the load cell 4 to be used for calculating the amount of load exerted by the actuator 9 while the measurement of the load cell 4 can be read directly or transmitted to an external device for display. For preventing the cell stack 20 from expanding rapidly, the temperature of the high-temperature furnace 30 is raised in a stepwise manner, and consequently that the actuator 9 is configured to raise its load in a stepwise manner. In this embodiment, the actuator 9 can start from exerting a load of 25 Kgw that is to be raised gradually along the raise of temperature in the high-temperature furnace 30. It is noted that the load cell 4 will keep measuring the displacement and the load variation during the whole temperature raising and load increasing.

To sum up, the present invention provides a load device capable of exerting a pressure uniformly on a cell stack for measuring and recording the relationship between the performance of the cell stack and variation of the loading pressure with respect to time so as to be used in an analysis for understanding the affection of the loading pressure can have upon the performance of the cell stack and the characteristic of the glass cement used in the stack while using the analysis as basis for improving the design of the cell stack.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:
1. A load device for a cell stack, comprising:
   a balance plate, abutted exactly against the top of the cell stack;
   a first column, disposed on top of the balance plate;
   a second column, mounted on top of the first column;
   a load cell, disposed on top of the first column an elastic member, disposed on top of the load cell;

an actuator, placed on top of the elastic member to be used for providing a load to the load cell, the elastic member and the first column in a manner that the first column is driven to press on the balance plate for enabling the same to exert a pressure on the cell stack; and wherein the balance plate and the first column are made of a material capable of resisting a high temperature that is at least 820° C.; and wherein the second column mounted on top of the first column in a coaxial manner and the second column fixes and positions the actuator, the elastic member, and the load cell by passing through centers of the actuator, the elastic member, and the load cell, and the second column is made of a material capable of withstand the heat transmitted from the first column.

2. The load device of claim 1, further comprising:
an equalizing ball, positioned inside a space enclosed between a concave formed on the bottom of the first column and another concave formed on the top of the balance plate.

3. The load device of claim 2, wherein the concave on the top of the balance plate is formed at the center thereof.

4. The load device of claim 2 wherein the equalizing ball is made of a heat-resistant material.

5. The load device of claim 4 wherein the heat-resistant material is sintered ceramics.

6. The load device of claim 1, wherein there are a lower press ring mounted on the bottom of the elastic member and an upper press ring mounted on the top of the same; and the two press rings are used for fixing the elastic member while preventing the same from contacting to the first column directly.

7. The load device of claim 6, wherein both the upper and the lower press rings are made of steel.

8. The load device of claim 1, further comprising:
an equalizing ring, disposed at a position between the actuator and the elastic member to be used for supporting a portion of the load.

9. The load device of claim 8, wherein the equalizing ring is made of steel.

10. The load device of claim 1, wherein the second column is made of steel.

11. The load device of claim 1, wherein the balance plate is made of a heat-resistant material sintered ceramics.

12. The load device of claim 1, wherein the first column is made of a heat-resistant material including sintered ceramics.

13. The load device of claim 1, wherein the elastic member is disc spring.

14. A high-temperature furnace with load device, comprising:
a high-temperature furnace, capable of generating a high temperature; and
a load device for a cell stacks, further comprising:
a balance plate, abutted exactly against the top of the cell stack;
a first column, disposed on top of the balance plate;
a second column, mounted on top of the first column;
a load cell, disposed on top of the first column
an elastic member, disposed on top of the load cell;
an actuator, placed on top of the elastic member to be used for providing a load to the load cell, the elastic member and the first column in a manner that the first column is driven to press on the balance plate for enabling the same to exert a pressure on the cell stack; and wherein the balance plate and the first column are made of a material capable of resisting a high temperature that is at least 820° C.; and wherein the second column mounted on top of the first column in a coaxial manner and the second column fixes and positions the actuator, the elastic member, and the load cell by passing through centers of the actuator, the elastic member, and the load cell, and the second column is made of a material capable of withstand the heat transmitted from the first column.

15. The high-temperature furnace of claim 14, further comprising:
an equalizing ball, positioned inside a space enclosed between a concave formed on the bottom of the first column and another concave formed on the top of the balance plate.

16. The high-temperature furnace of claim 15, wherein the concave on the top of the balance plate is formed at the center thereof.

17. The high-temperature furnace of claim 15, wherein the equalizing ball is made of a heat-resistant material, and the equalizing ball is placed inside the high-temperature furnace.

18. The load device of claim 17 wherein the heat-resistant material is sintered ceramics.

19. The high-temperature furnace of claim 14, wherein there are a lower press ring mounted on the bottom of the elastic member and an upper press ring mounted on the top of the same; and the two press rings are used for fixing the elastic member while preventing the same from contacting to the first column directly.

20. The high-temperature furnace of claim 19, wherein the upper and the lower press rings are both made of steel, and are disposed outside the high-temperature furnace.

21. The high-temperature furnace of claim 14, further comprising:
an equalizing ring, disposed at a position between the actuator and the elastic member to be used for supporting a portion of the load.

22. The high-temperature furnace of claim 21, wherein the equalizing ring is made of steel, and is disposed outside the high-temperature furnace.

23. The high-temperature furnace of claim 14, wherein the load cell and the actuator are disposed outside the high-temperature furnace.

24. The high-temperature furnace of claim 14, wherein the second column is made of a heat-resistant material including steel, and is disposed outside the high-temperature furnace.

25. The high-temperature furnace of claim 14, wherein the balance plate is made of a heat-resistant material including sintered ceramics, and is disposed inside the high-temperature furnace.

26. The high-temperature furnace of claim 14, wherein the first column is made of a heat-resistant material including sintered ceramics, and is disposed inside the high-temperature furnace.

27. The high-temperature furnace of claim 14, wherein the elastic member is a disc spring disposed outside the high-temperature furnace.

* * * * *